United States Patent [19]
Newton

[11] Patent Number: 5,562,368
[45] Date of Patent: Oct. 8, 1996

[54] AIR TUNNEL TRACK INTERFACE

[75] Inventor: Stanley L. Newton, DeBary, Fla.

[73] Assignee: Newton and Harrington, Inc., Sanford, Fla.

[21] Appl. No.: 245,219

[22] Filed: May 17, 1994

[51] Int. Cl.$^6$ ................................................ B65G 51/03
[52] U.S. Cl. ........................... 406/86; 406/68; 406/88
[58] Field of Search .............................. 406/52, 63, 64, 406/65, 66, 67, 68, 86, 88, 108, 151, 152, 153

[56] References Cited

U.S. PATENT DOCUMENTS

| | | |
|---|---|---|
| 4,724,036 | 2/1988 | Mann et al. ................... 406/86 X |
| 5,037,244 | 8/1991 | Newton ............................ 406/88 X |
| 5,100,265 | 3/1992 | Mirkin ............................... 406/86 |

*Primary Examiner*—Andrew C. Pike
*Attorney, Agent, or Firm*—Malin, Haley, DiMaggio & Crosby, P.A.

[57] ABSTRACT

An air tunnel track interface attaches to a can testing apparatus for receiving cans from the output of the can testing apparatus and transferring them to a conveyor system. The air tunnel track interface comprises two parallel substantially U-shaped tracks each having an air chamber, a plurality of air louver jets and diverging ends, and a pair of parallel discharge plates each having diverging cutouts for mating with the diverging ends of the U-shaped tracks.

13 Claims, 4 Drawing Sheets

AIR TUNNEL TRACK INTERFACE

BACKGROUND OF THE INVENTION

1. Field of the Invention

The present invention relates generally to an improved tunnel track interface for use with air-powered conveyor systems, and more particularly to an improved air tunnel track that interfaces the output of a can testing system with an air-powered conveyor system to increase the operation speed of the entire system.

2. Description of the Background Art

The LT-16-SM light tester is a self-contained electrical mechanical machine manufactured by Randolph Machinery Operations (a division of Alcoa Packaging Machinery, Inc.) to perform high speed automatic inspection of cans for defects in the flange and wall which could cause the cans to leak. The light tester checks for flange cracks and body holes by shining a light at a known 15 frequency inside the can as the cans are transferred along a main carrier wheel. Light sensing arrays are mounted on the carrier wheel so that only light passing through the cans is detectable. If light from the cans is detected, the sensing arrays are switched to a state that triggers the reject receiver causing the can to be rejected. Meanwhile, a discharge mechanism separates good cans from bad cans by transferring acceptable cans from a transfer point on the carrier wheel to a discharge transfer wheel assembly that feeds a conventional conveyor system. The light tester is capable of testing cans at speeds over 3,000 cans per minute (CPM).

A problem, however, occurring with the LT-16 light tester, and other systems utilizing similar discharge features, is that the testers are incapable of operating at full capacity without the cans jamming the tester. As a matter of fact, the system must typically be run at half speed in order to ensure against jamming. If the system is operated at too high a speed the cans have a tendency to "jam" at the discharge chute as the conveyors are fed.

One reason jamming occurs is that conventional chain driven conveyor systems are unreliable, inefficient, and slower. Accordingly, the light tester's speed must be decreased to synchronize it with the chain drive conveyor speed. On the other hand, air-powered conveyor systems, such as the dual plenum design disclosed by the inventor in U.S. Pat. No. 5,037,244, are capable of transporting cans through the conveyor system from one station to another at speeds comparable to the can tester, i.e., at a full line speed of approximately 3,600 CPM. Unfortunately, however, the light tester is also susceptible to jamming with the air-powered conveyor system when operated at speeds exceeding half capacity because of the path the can travels from the discharge assembly.

The dual plenum air-powered conveyor system disclosed in U.S. Pat. No. 5,037,244 comprises two U-shaped guide members, or inverted channels, in parallel and similar U-shaped jet plates that fit individually into the respective guide members to form air chambers or plenums therebetween. A plurality of spaced louver punches or air inlets are provided in the jet plate so that air supplied to the plenums by an outside source is fed into the can conveyance path to move the cans. Although the above noted air-powered conveyor systems are capable of running at 3,600 CPM they are presently incompatible for receiving cans from the light tester at full capacity. When the cans are released from the discharge chute they oscillate or bounce down the path slowing down subsequent cans. However, if the system is operated at slower speeds, such as 1,600 CPM, the cans are able to settle into a straight path so as to prevent jamming. Consequently, even though both systems in isolation are capable of running at over 3,000 CPM, in operation the present dynamics of the combination do not allow full capacity operation. The operator must therefore choose between running the risk of jamming which necessitates shutting the tester down or operating at less than full capacity. In either event, a loss of time and money results.

Therefore, as a result of the above-noted there exist a need for an interface device for communicating the light tester with conveyor systems in a way that allows the light testing system to operate at full capacity. The present invention satisfies this need by providing an air tunnel track attachment that generally interfaces the light tester with an air-powered conveyor system increasing the discharge speed of the cans so that the light tester and conveyor system may be operated near full capacity.

SUMMARY OF THE INVENTION

It was with the foregoing in mind that the inventor was motivated to design an interface which is readily adaptable to communicate the Light Tester, LT-16, or similar systems, with the air-powered conveyor system taught by Newton, U.S. Pat. No. 5,037,244, or comparable air driven conveyors. The present invention comprises an improved air tunnel discharge track interface that increases the operating speed range of the can light testers, or similar seamless can testing systems, by increasing the rate at which cans are fed into corresponding air-powered conveyor systems. The air tunnel discharge track preferably interfaces the LT-16 Light Tester with the noted dual plenum air-powered conveyor system.

The present invention allows the tester to operate at full capacity whereby it comprises two parallel discharge plates configured to the discharge transfer wheel and modified for attaching an air tunnel track proximal the discharge transfer wheel to control the path the cans take into the conveyor system. The two discharge plates are milled to define a cutout that diverges from the discharge end of the plate to a point proximal the discharge wheel. An air tunnel track comprising two parallel U-shaped tracks, each having an air chamber, forms a diverging end that fixedly mates with the diverging cutout defined by the plates. This configuration places the air tunnel track closer to the discharge transfer wheel so as to accept cans from the discharge wheel earlier in their path before the force of discharge causes them to oscillate down the path.

The operating dynamics of the instant invention is to feed air from the air chambers, through air louver inlets, and into the air tunnel track to create an air stream flowing away from the discharge transfer wheel. The air flow through the air tunnel track induces a low pressure or slight vacuum which pulls the cans on an optimal path, dampening the oscillating can path, and into the fitting as they are discharged from the transfer wheel. The cans are thereby directed into the air conveyor system. The diverging interface also provides a wide-mouth opening near the discharge transfer wheel for receiving cans moving on a correct path and to catch those which may deviate from the desired path. A straight, continuous, and parallel path is formed as the tunnel fitting extends away from the discharge end of the plate toward the conveyor system to move and guide cans quickly through the air tunnel at high speeds. Consequently, the improved discharge track is able to increase the operating speed of the light tester and the conveyor system by modifying the discharge guide plates to accept the air tunnel track as far up into the can path as possible and by creating a vacuum to improve the dynamic characteristics of the discharging cans.

It is an object of the invention to provide an air tunnel track interface for mechanically communicating can testing systems with air conveyance systems in a way that allows the tester to operate at full capacity.

It is another object of the present invention to provide an air tunnel track interface that produces an air flow for pulling or drawing in cans that may deviate from the desired path as they are released from the tester's discharge wheel so as to prevent jamming of the system.

It is an additional object of the instant invention to provide an air tunnel track interface that may be used to prevent jamming of present can light tester systems.

It is a further object of the instant invention to improve the LT-16 light tester system in a cost efficient manner so as to eliminate jamming problems and increase overall operating speed.

It is yet another object of the instant invention to improve and modify the LT-16 light tester system with a diverging cutout in its guide plates for affixing and fitting an air tunnel track that interfaces the light tester with air conveyance systems.

In accordance with these and other objects which will become apparent hereinafter, the instant invention will now be described with particular reference to the accompanying drawings.

DESCRIPTION OF THE PREFERRED EMBODIMENTS

Figure 1:
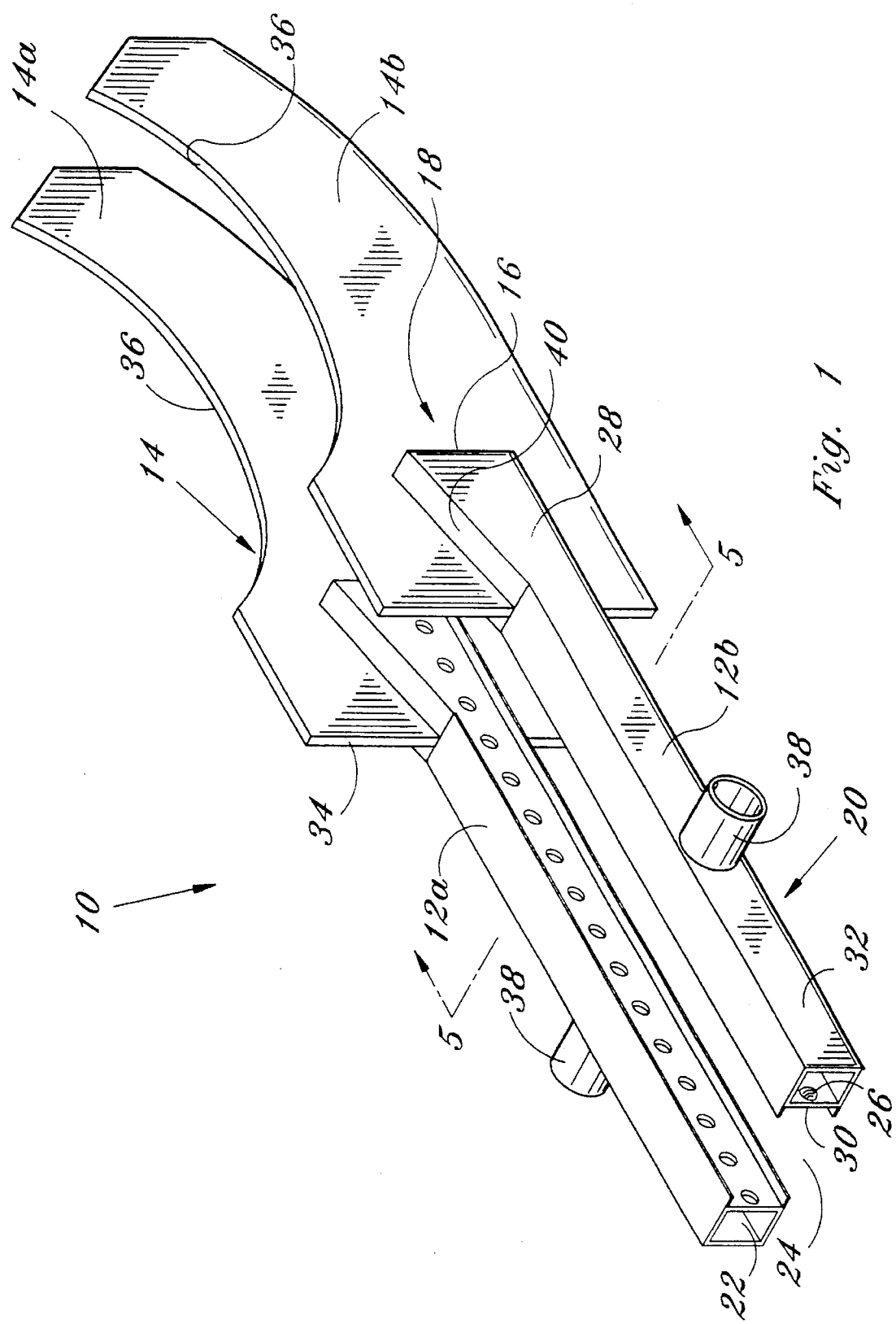
FIG. 1 is a perspective view of the air tunnel track interface.
Figure 2:
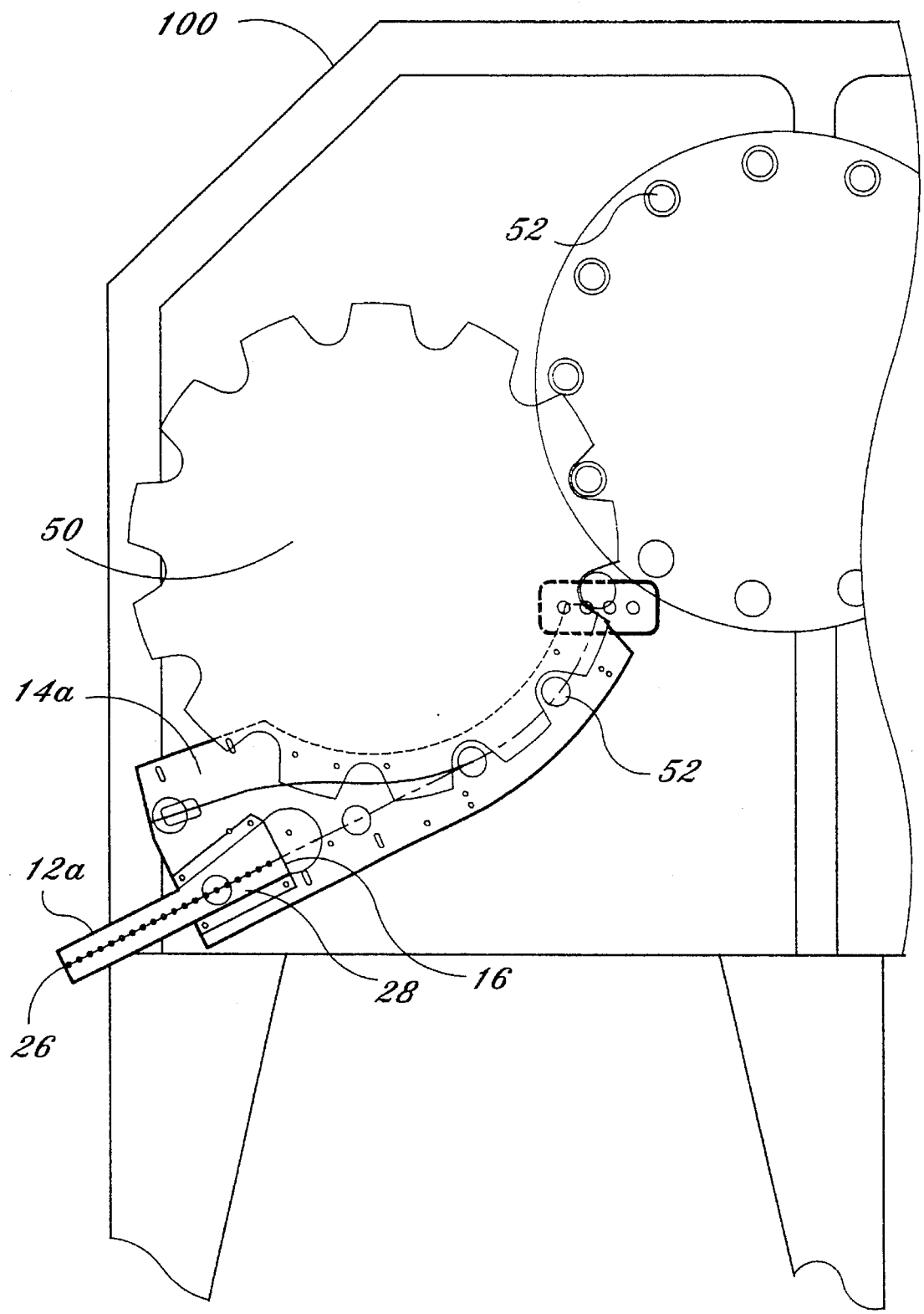
FIG. 2 is a side cut away view of the LT-16 light tester illustrating the air tunnel track interface and its operation with the LT-16 light tester.
Figure 4:
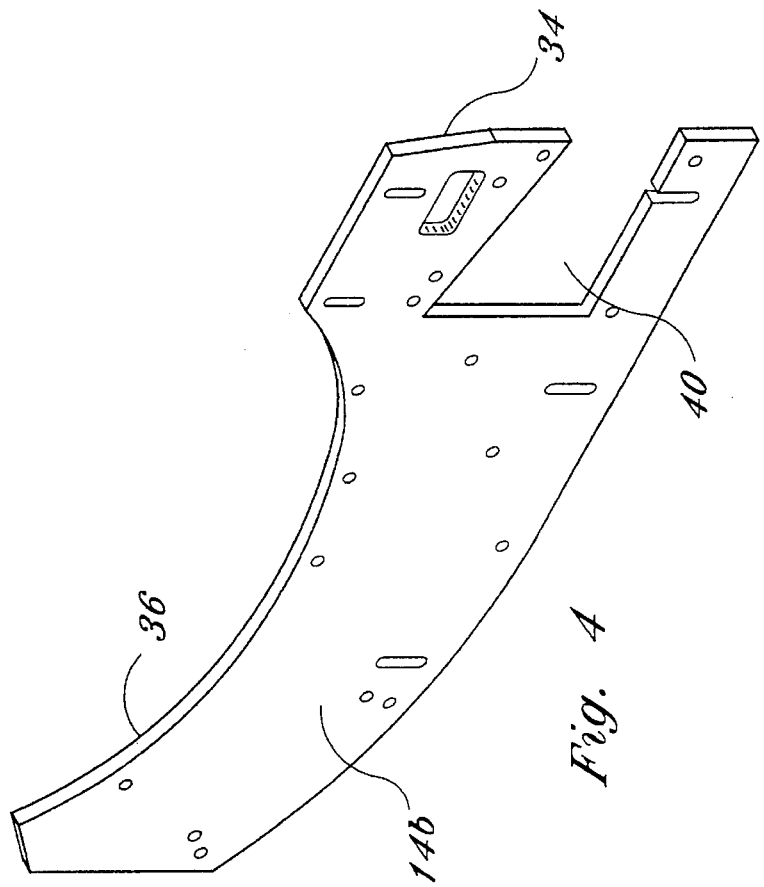
FIG. 4 is a perspective view of a discharge guide plate illustrating the diverging cutout.
Figure 5:
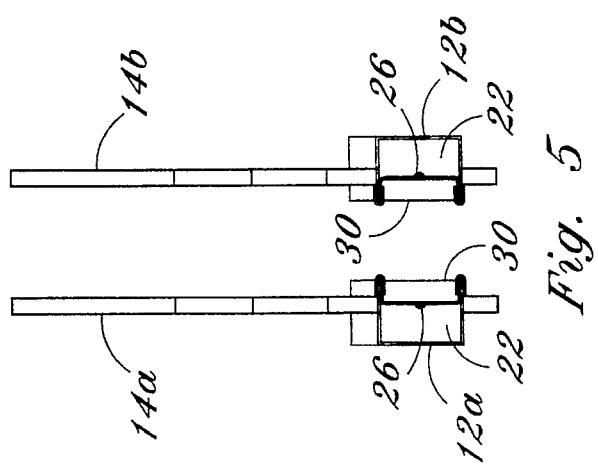
FIG. 5 is a front cross-sectional view of the air tunnel track interface taken along line 5—5 in FIG. 1.
Figure 6:
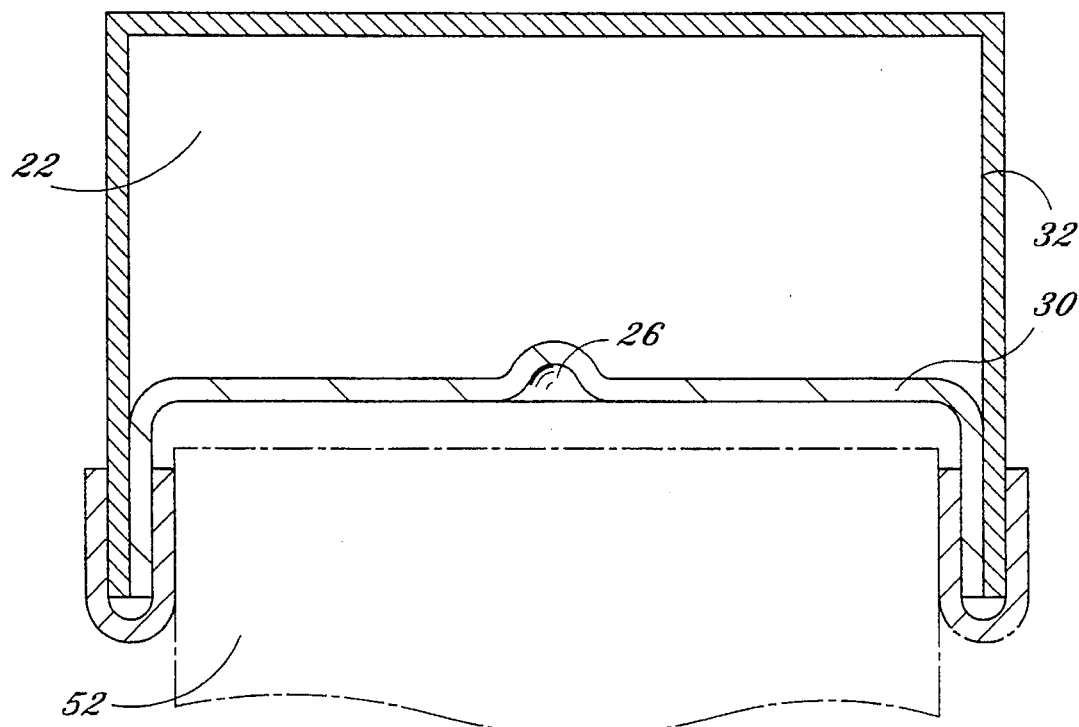
FIG. 6 is a cross-sectional view of the jet plate illustrating the air louver inlet, the air plenum chamber, and a simulated can.
Figure 7:
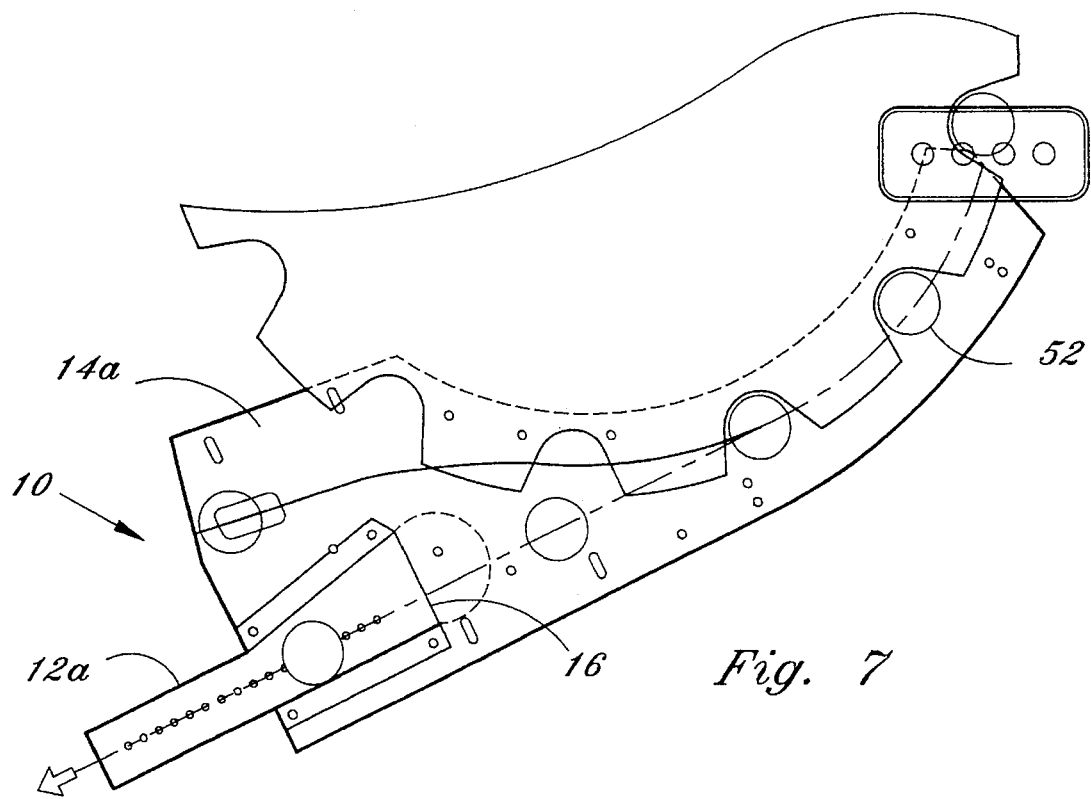
FIG. 7 is a partial expanded view of FIG. 2.

With reference to the drawings, FIGS. 1–7 depict an air tunnel track interface referenced by the numeral character 10. The air tunnel track interface is illustrated in FIG. 1 whereby the interface comprises discharge guide channel/plate members 14a, 14b, U-shaped tunnel track 12a, 12b, and the U-shaped jet plates 30 fitted into respectively U-shaped guide members 12a, 12b. The discharge guide plates 14 include a first guide plate 14a and a second guide plate 14b, each having an arcuate discharge transfer wheel edge 36, a discharge end 34, and tunnel track cutouts 40. The arcuate discharge transfer wheel edges 36 are shaped to configure to the discharge transfer wheel 50 which is shown in FIG. 2 and FIG. 7. The air tunnel track 12 comprises a first U-shaped track 12a and a second U-shaped track 12b, each having an air chamber 22, wherein each of the first and second U-shaped tracks 12a, 12b are fitted into the milled cutout 40, as defined by the guide plates 14a, 14b respectively, so that the tunnel tracks 12a, 12b are in parallel, with one being the mirror image of the other. Each U-shaped track 12a, 12b has an upper and lower lip that together define a diverging end 28 which diverges towards the proximal end 18 to form a wide mouth can opening or inlet 16.

The first and second U-shaped tracks 12a, 12b are each individually formed by a U-shaped guide track 32 having a U-shaped jet plate 30 fixedly secured in its opening facing the same direction. The guide tracks 32 and the jet plates 30 form a pair of air plenum chambers 22 therebetween. The jet plates 30 define a plurality of spaced air louver inlets 26 that force air in one direction, that is, away from the tester. Air taps 38 supply air into the air chambers 22 which gets directed through the air louver inlets 26 into the can tunnel path 24, as seen in FIG. 1. The air louver inlets 26 define air chutes that produce air flow in the direction away from the discharge ends 34 as indicated in the Figures. The diverged wide mouth opening 16 and the air flow away from the discharge plates creates a low pressure or vacuum that draws the cans into the air tunnel track 12.

Referring to FIG. 2, the air tunnel track interface 10 is shown attached to the LT-16 light tester 100 to illustrate the way cans 52 are drawn into the air tunnel track 12 by the vacuum created. In FIG. 2, the inside of the first U-shaped track 12a, the jet plate 30, and the air louver inlets 26 can be seen. As discharge wheel 50 rotates clockwise good cans 52 are directed along the guide plates 14a, 14b from the transfer point, which is defined by the can tester 100 adjacent the can receiving opening 16, into the air tunnel track 12 formed by the first and second U-shaped tracks 12a, 12b. The diverging end 28 defines wide mouth opening 16 which gives a bigger inlet for the cans to be captured for transporting on to the conveyor system. The air flow away from the wide mouth opening 16 produces a low pressure outside the opening 16, thus inducing a vacuuming effect, making the air tunnel track 12 an efficient and reliable interface between the light tester 100 and the air-powered conveyor system.

Figure 3:
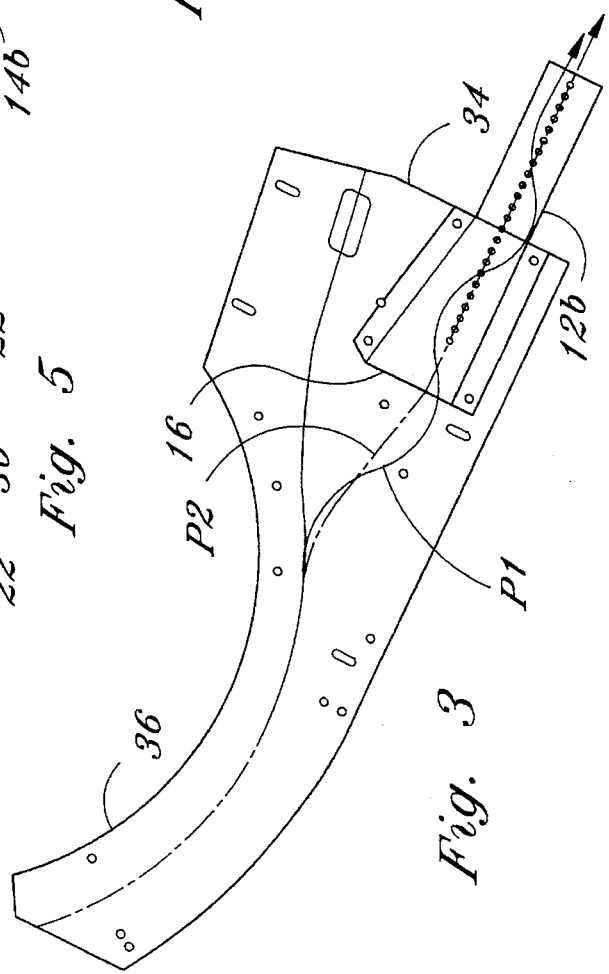
FIG. 3 is a side elevational view of the inside section of the air tunnel track interface showing one discharge guide plate with a fitted tunnel track.

In FIG. 3, there is depicted the second U-shaped track 12b and the second discharge guide plate 14b. It should be noted that the first U-shaped track 12a and the first discharge guide plate 14a are also fitted as shown in FIG. 3. The U-shaped tracks 12a, 12b have diverging ends 28 which each mate with a corresponding diverging cutout 40 defined by respective guide plates 14a, 14b to place the air tunnel track 12 closer to the discharge transfer wheel so as to receive cans early in their path from the discharge wheel 50, as seen in FIG. 2. Each mill cutout 40 corresponds to the shape of the corresponding first and second U-shaped tracks 12a, 12b for securely fixing and placing the tunnel track 12 proximal to the transfer wheel 50 and the transfer point. The mill cutout 40 in each guide plate 14a, 14b diverges from their discharge end 34 toward the transfer point. In FIG. 3, P1 represents the path cans take without the air tunnel track interface 10, while P2 shows the optimal path which the cans 52 take into the air tunnel track 12 when the interface 10 is provided. The vacuum produced by the air tunnel track 12 and the air flow away from the guide plates 14a, 14b induce the path P2 which the cans 52 take. The guide plates 14 are hard chrome plated and have an arcuate discharge transfer wheel edge 36 which corresponds with the transfer wheel 50 shape, illustrated in FIG. 7.

FIG. 5 provides a front view looking into the can tunnel path 24. Referring to FIG. 6, a large view of the jet plates 30 shows its relationship to the air plenum chambers 22. As can be seen, the air louver inlets 26 serve as air inlets into the can tunnel 24 where the cans are being conveyed. Air from the plenum chambers 22 is directed through the air inlets 26 as seen in FIG. 6 to provide air flow in the direction shown in FIG. 7. Referring to FIG. 7, a low pressure area is formed by this flow of air through the air tunnel track 12 to create the vacuum which aids in drawing the cans through the interface 10. Accordingly, as best seen by FIGS. 1, 2, and 7, the air tunnel track interface 10 as defined by the tunnel track 12 and the guide plates 14 receives air from the air chambers to create the flow of air indicated to draw cans into the path 24 as they are discharged from the transfer wheel 50. The wide mouth inlet 16 assist in creating the low pressure needed at the inlet while providing a bigger opening for catching cans which may deviate from the desired path. This diverging end 28 blends into a straight, continuous path as it extends away from the discharge end 34 of the plates 14 toward the conveyor system, not shown. Consequently, the interface 10 increases the overall operating speed of the light tester so that it corresponds with the speeds realized by air-powered conveyor systems such as the one disclosed in U.S. Pat. No. 5,037,244.

The instant invention has been shown and described herein in what is considered to be the most practical and preferred embodiment. It is recognized, however, that departures may be made therefrom within the scope of the invention and that obvious modifications thereto will occur to a person skilled in the art.

What is claimed is:

1. A can tester segment for guiding cans from a transfer point defined by a can tester apparatus into an air-powered conveyor system, said segment comprising:

a guide channel means, attached to the can tester apparatus, for receiving and guiding the cans from the can tester apparatus, said guide channel means having a discharge edge distal from the transfer point, said guide channel means guiding the cans from the transfer point to said discharge edge;

a cutout defined by said guide channel means, said cutout diverging from said discharge edge towards the transfer point;

a tunnel track interface having a can-receiving end mated with said cutout and a can-expelling end attached to the air-powered conveyor system, said guide channel means guiding the cans into said tunnel track interface;

said can-receiving end defining a wide-mouthed opening being proximal to the transfer point so as to catch the cans as they depart from the transfer point, said tunnel track interface receiving and guiding the cans into the air-powered conveyor system; and means for supplying air inside said tunnel track interface to provide an air flow cushion that pulls the cans into said tunnel track interface and moves the cans away from the can tester apparatus and into the air-powered conveyor system.

2. A can tester segment as recited in claim 1, wherein said guide channel means comprises:

a first guide plate having a first discharge edge; and a second guide plate having a second discharge edge, said second guide plate being substantially parallel to said first guide plate such that said first and second guide plates provide a path for guiding cans into said tunnel track interface.

3. A can tester segment as recited in claim 2, wherein said cutout comprises:

a first cutout defined by said first guide plate, said first cutout diverging from said first discharge edge toward the transfer point; and a second cutout defined by said second guide plate, said second cutout diverging from said second discharge edge toward the transfer point.

4. A can tester segment as recited in claim 3, wherein said tunnel track interface comprises:

a first guide track having a first receiving end mated with said first cutout; and a second guide track having a second receiving end mated with said second cutout, said first and second guide tracks being substantially parallel so as to define a can tunnel path therebetween for guiding the cans into the air-powered conveyor system.

5. A can tester segment as recited in claim 1, further including a first air chamber defined along one side of said tunnel track interface and a second air chamber defined along an opposite side of said tunnel track interface, said first and second air chambers receiving the air from a source of pressure.

6. A can tester segment as recited in claim 1, wherein said means for supplying the air inside said tunnel track interface comprises a plurality of air louver inlets defined by said tunnel track interface for directing the air from a source of pressure into said tunnel track interface.

7. A can tester segment as recited in claim 1, further including a jet plate insert attached to said tunnel track interface; and an air chamber defined between said jet plate insert and said tunnel track interface, said air chamber receiving the air from a source of pressure, said jet plate insert cooperating with said air chamber to provide air flow into said tunnel track interface for transporting the cans away from the can tester apparatus.

8. A can tester segment for guiding cans from a transfer point defined by a can tester apparatus into an air-powered conveyor system, said segment comprising:

a guide channel means, attached to the can tester apparatus, for receiving and guiding the cans from the can tester apparatus at the transfer point;

a tunnel track interface having a can-receiving end attached to said guide channel means and a can-expelling end attached to the air-powered conveyor system, said tunnel track interface transporting the cans from the can tester apparatus to the air-powered conveyor system while allowing the can tester apparatus to operate at full capacity;

a can tunnel path defined by said tunnel track interface for transporting the cans from the can tester apparatus to the air-powered conveyor system;

a cutout defined by said guide channel means for receiving said tunnel track interface so as to place said tunnel track interface proximal to the transfer point for receiving the cans as they depart from the transfer point; and means for creating a vacuum inside said tunnel track interface for drawing the cans from the transfer point into said can tunnel path.

9. A can tester segment as recited in claim 8, wherein said tunnel track interface comprises a first guide member and a second guide member, each individually attached to the can tester apparatus at one end and attached to the air-powered conveyor system at an opposite end, said first and second guide members being substantially parallel, said first and second guide members defining said can tunnel path therebetween for guiding the cans into the air-powered conveyor system.

10. A can tester segment as recited in claim 9, wherein said means for creating a vacuum comprises:

a first jet plate insert attached to said first guide member and a second jet plate insert attached to said second guide member; and a first air chamber defined between said first guide member and said first jet plate insert and a second air chamber defined between said second guide member and said second jet plate insert, said first and second air chambers receiving air from a source of pressure to provide air flow into said can tunnel path so as to transport the cans away from the can tester apparatus.

11. A can tester segment as recited in claim 10, wherein said first and second guide members are substantially "U"-shaped, said first and second jet plate inserts being inserted within said first and second "U"-shaped guide members, respectively, so as to define said first and second air chambers, respectively.

12. A can tester segment as recited in claim 8, wherein said can-receiving end includes a lower surface and an upper surface diverging toward the can tester apparatus.

13. A can tester segment as recited in claim 8, wherein said tunnel track interface defines a diverging end disposed in said cutout for receiving the cans from the can tester apparatus, said cutout also diverging toward the can tester apparatus so as to mate with said diverging tunnel track end.

* * * * *